United States Patent [19]
Kiatipoff

[11] 3,825,304
[45] July 23, 1974

[54] METHOD OF ELECTRONICALLY CONTROLLING BRAKING OF A VEHICLE AND AN ELECTRONICALLY CONTROLLED BRAKING DEVICE FOR A VEHICLE

[75] Inventor: Edmond Kiatipoff, Paris, France

[73] Assignees: Andre Sauget, Saint-Cyr; Michel Fremand, Saint-Oven, both of, France

[22] Filed: May 24, 1972

[21] Appl. No.: 256,541

[30] Foreign Application Priority Data
May 27, 1971  France .............................. 71.19285
Apr. 28, 1972  France .............................. 72.15346

[52] U.S. Cl. ............. 303/21 BE, 188/181 C, 303/20
[51] Int. Cl. ............................................... B60t 8/08
[58] Field of Search ............. 188/181 C; 303/20, 21; 317/5; 324/161; 340/263

[56] References Cited
UNITED STATES PATENTS
| | | | |
|---|---|---|---|
| 3,574,415 | 4/1971 | Stamm ............................ | 303/21 EB |
| 3,582,152 | 6/1971 | Burckhardt et al. ............. | 303/21 EB |
| 3,583,773 | 6/1971 | Steinbrenner et al. ......... | 303/21 EB |
| 3,653,727 | 4/1972 | Kullberg et al. .................. | 303/21 P |
| 3,690,735 | 9/1972 | Arai et al. ..................... | 303/21 EB X |

Primary Examiner—Trygve M. Blix
Assistant Examiner—Stephen G. Kunin
Attorney, Agent, or Firm—Hane, Baxley & Spiecens

[57] ABSTRACT

The present invention relates to an electronic braking method and installation for wheeled vehicles.

The installation comprises sensors for determining the speeds of the wheels, apparatus for memorizing the speed of the vehicle and apparatus for braking the rear wheel or wheels in such a way as to bring it (them), during a braking phase, to a speed equal to a first fraction of the memorized speed of the vehicle until the speed of the vehicle is equal to that of the rear wheel or wheels, apparatus for braking the front wheel or wheels, during said braking phase and concurrently with the braking of the rear wheel or wheels, in such a way as to bring it (them) to a speed equal to a second fraction, smaller than the first fraction, of the memorized speed of the vehicle, and apparatus for operating the memorization apparatus at the end of said braking phase to start new braking phases.

18 Claims, 12 Drawing Figures

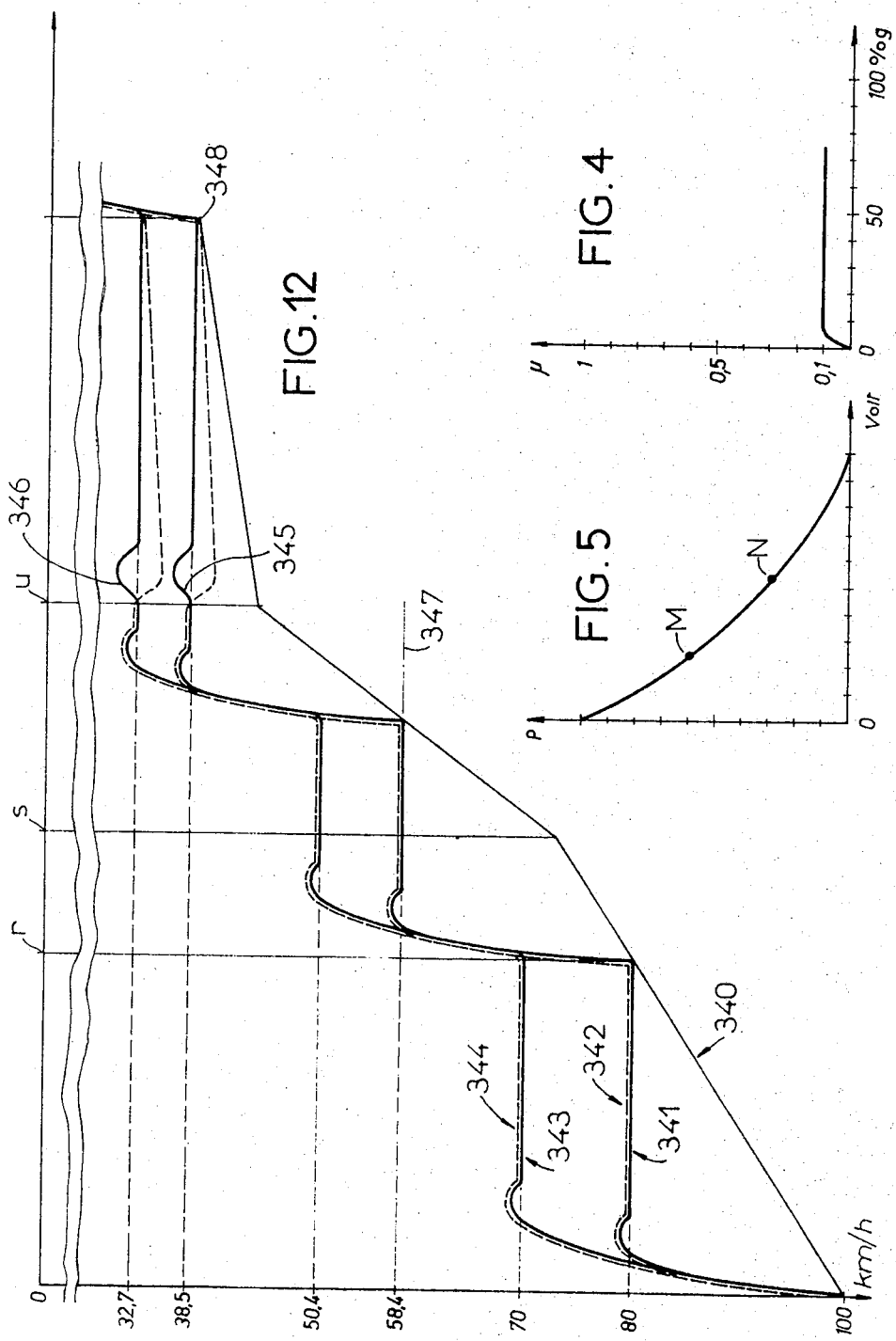

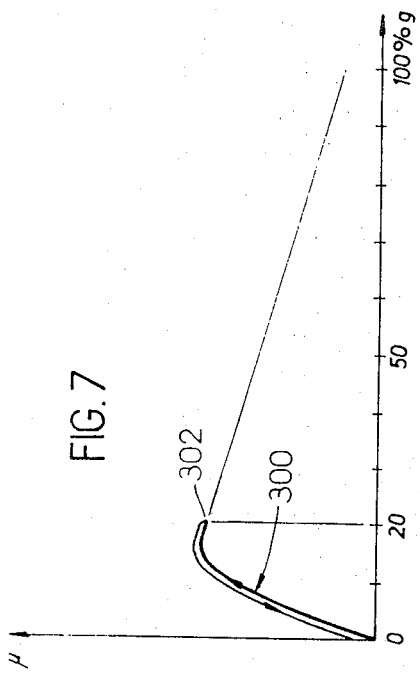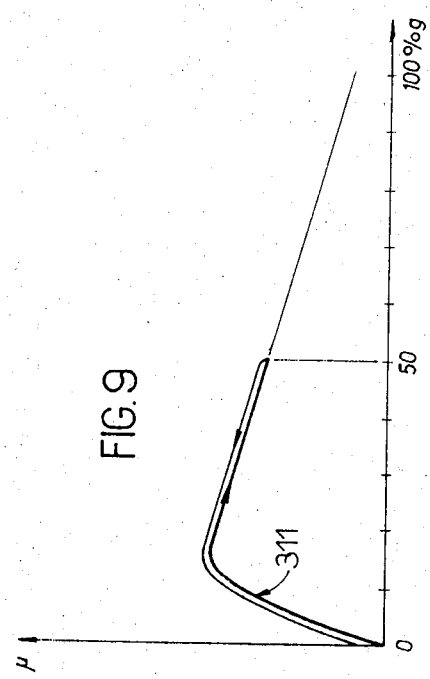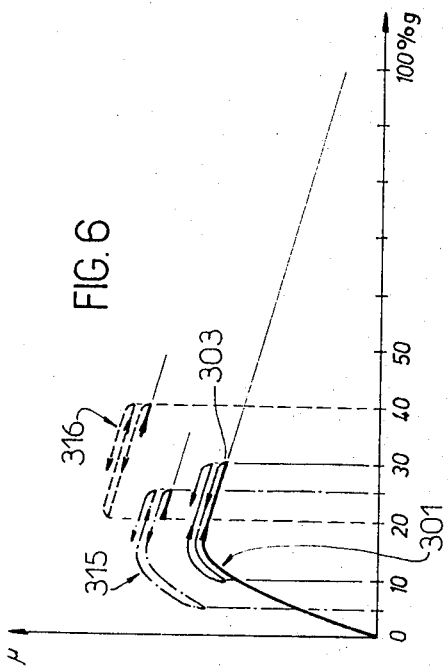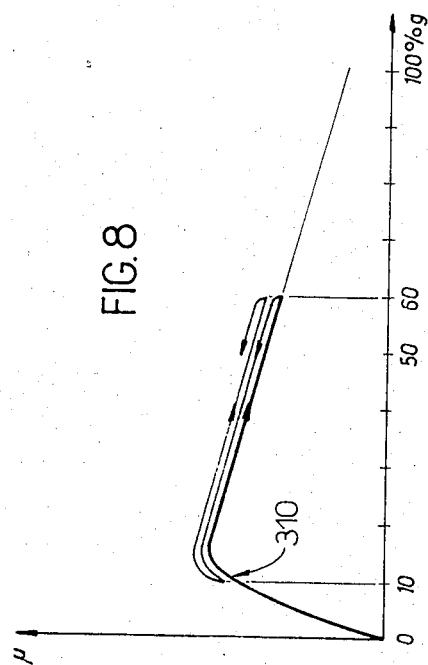

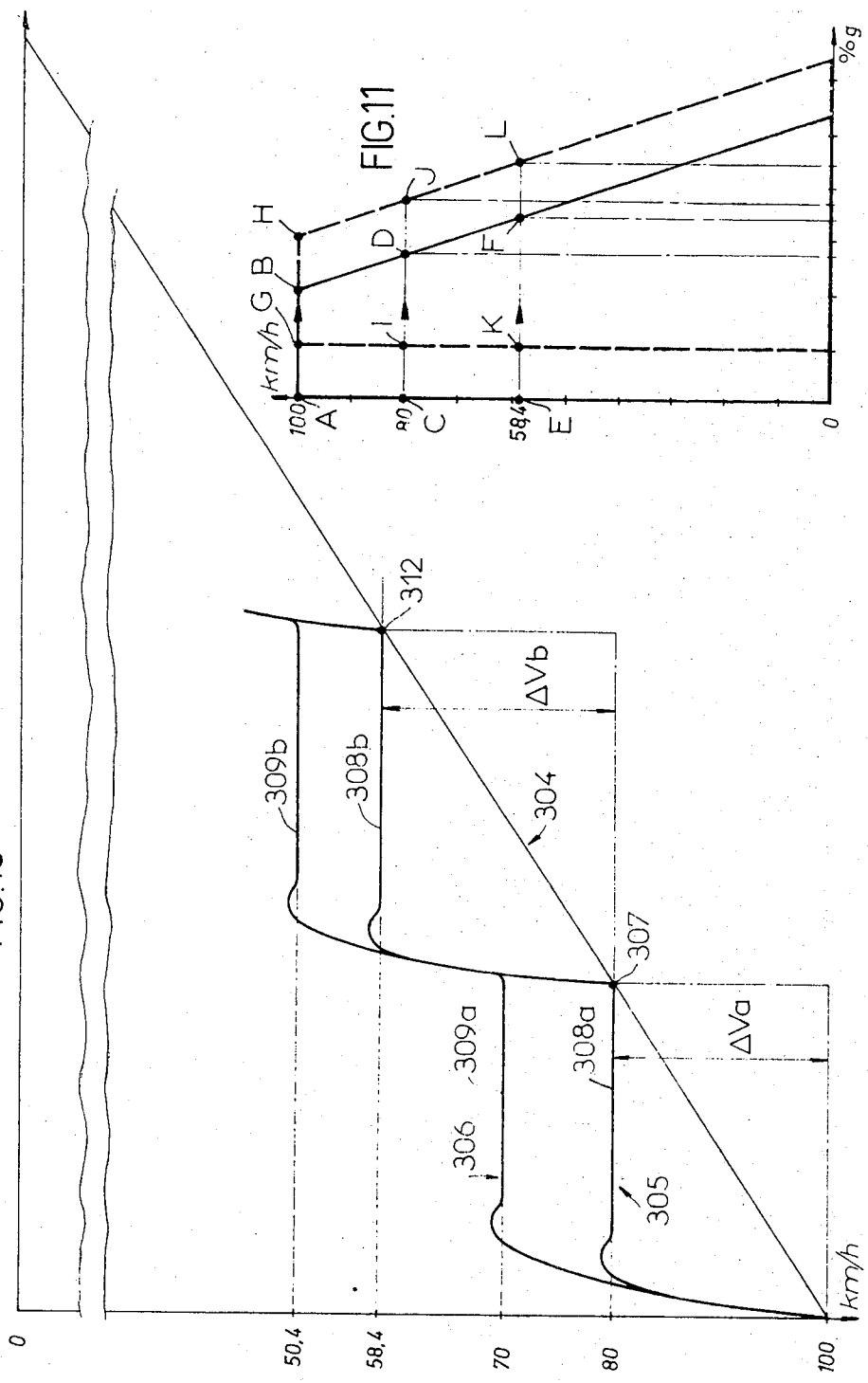

METHOD OF ELECTRONICALLY CONTROLLING BRAKING OF A VEHICLE AND AN ELECTRONICALLY CONTROLLED BRAKING DEVICE FOR A VEHICLE

The present invention relates to an electronical braking method and installation for wheeled vehicles.

Safe travelling depends on the efficiency of the braking system of wheeled vehicles, particularly automobile road vehicles: the brakes must bring the vehicle to a standstill within a minimum distance without locking the wheels in order that it may remain possible to control the steering.

Brake systems are known whereby, in order to avoid locking the wheels, the deceleration of a wheel is measured during braking and braking is discontinued when deceleration exceeds a predetermined value.

With such a system, when the driver operates the brake system, for example by depressing a brake pedal, the wheels are locked then freed, then locked again, etc, which gives rise to a succession of jerks that are clearly perceptible and sometimes unpleasant.

Furthermore, the very principle of de-braking on the basis of a wheel deceleration renders the system inefficient when road friction conditions are unsatisfactory, for example in the case of a road vehicle travelling along a wet road.

The braking method according to the invention has the dual aim of securing maximum efficiency, that is to say of ensuring that the vehicle stops within a minimum distance and, on the other hand, of preventing any wheel from being completely locked, even in poor road friction conditions, for example in the case of a road vehicle travelling along a wet, slippery road.

The braking method according to the invention, for a vehicle having at least one front wheel and at least one rear wheel, in which the speed of a wheel and the speed of the vehicle are determined, the latter speed being memorized and used to operate a subsequent braking phase, is characterized in that, in one braking phase, one wheel or the wheels of a first wheel train is (are) braked in order to bring it (them) to a first speed corresponding to a first slip or skid value predetermined in relation to the memorized speed of the vehicle, this phase being continued until the speed of the vehicle is equal to said first speed, in that, simultaneously, the wheel or wheels of the second wheel train is (are) braked to bring it (them) to a second speed corresponding to a second slippage or skid value predetermined in relation to the memorized speed of the vehicle, greater than the first slip value, in that, at the end of this first phase, the said first speed is memorized and in that a second braking phase is begun for which said first speed plays the part of the speed of the vehicle memorized in the first phase, etc.

An installation for braking a vehicle by applying the method according to the invention, comprising a captor for determining the speed of a wheel, together with means for memorizing the speed of the vehicle, is further characterized in that it comprises means for braking the rear wheel or wheels in such a way as to bring it (them), during a braking phase, to a speed equal to a first fraction of the memorized speed of the vehicle until the speed of the vehicle is equal to that of the rear wheel or wheels, means for braking the front wheel or wheels, during siad braking phase and concurrently with the braking of the rear wheel or wheels, in such a way as to bring it (them) to a speed equal to a second fraction, smaller than the first fraction, of the memorized speed of the vehicle, and means for operating the memorization of the speed of the vehicle at the end of said braking phase and initiating new braking phases.

The wheel or train of wheels to which the lower speed instruction is transmitted thus has (have) a constant braking effect. Braking is efficient and the whole process occurs without jerks or jolts being felt by the occupants of the vehicle.

In the following description, given by way of example, reference is made to the attached drawing in which:

FIGS. 4 to 12 are diagrams.

In the description which follows, the invention is illustrated in its application to a four wheeled road automobile vehicle without, of course, this application being of a limitative nature, particularly as regards the number of wheels on the vehicle and/or the type of vehicle.

Figure 1:
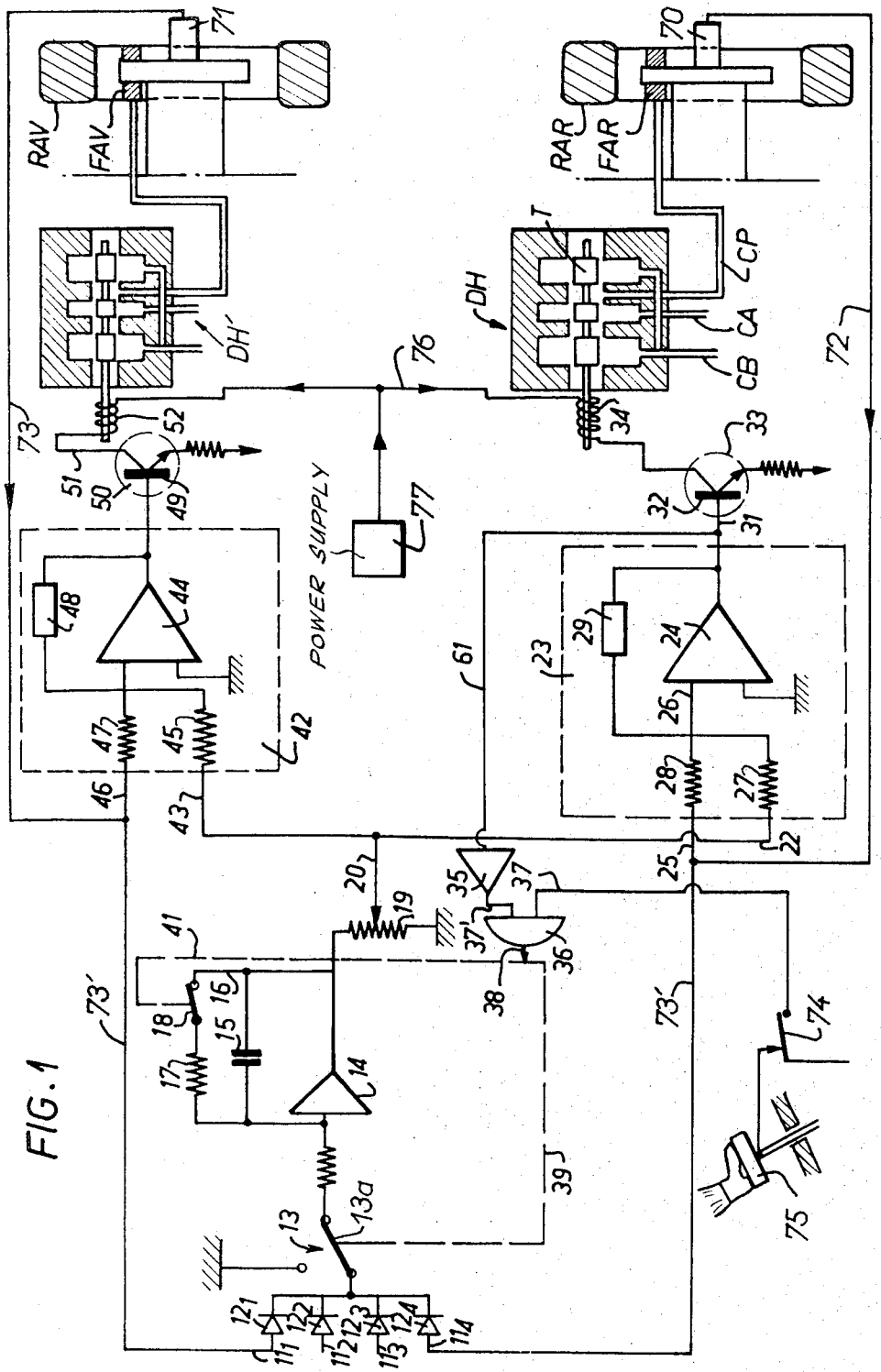
FIG. 1 shows a braking installation according to a first embodiment of the invention.

In the embodiment of FIG. 1, voltages proportional to the speed of a rear wheel RAR and a front wheel RAV of an automobile are determined by captors 70, 71 and applied by circuits 72—72' and 73—73', and by circuits $11_1$, $11_2$, $11_3$, $11_4$, with diodes $12_1$—$12_4$, by means of a switch 13 with a mobile blade 13a, to an operational amplifier 14 which, when switch 13 is closed, charges a memory capacitor 15 to a capacity value corresponding to the highest voltage on circuits 11.

A circuit 16 of capacitor 15 which comprises a resistance 17 is connected through a second switch 18 with a potentiometer 19 enabling, through its mobile element 20, adjustment of the voltage at an input 22 of a regulator 23 associates to a rear wheel of the vehicle.

To the second input 25 of said regulator is applied a voltage varying as a function of the speed of said rear wheel as determined by means of the captor 70 associated to said wheel, the voltages applied to inputs 22 and 25 being of opposite polarities.

Inputs 22 and 25 are connected to an input 26 of an amplifier 24, another input of which is earthed, by means of resistances 27 and 28 respectively. Branch connected with respect to amplifier 24 is a transfer device 29, for example a frequency dependant gain phase advance device, as is usual in servomechanisms.

The output 31 of regulator 23, through its connection to a base 32 of a transistor 33, controls the current flowing through a winding 34 of an electro-hydraulic, electropneumatic or electromechanical device DH located in the brake system of said wheel whereby the pressure of the brake fluid may be applied.

In the embodiment illustrated, the DH brake pressure control device comprising a winding 34 connected by a circuit 76 to an electrical power supply 77 is a hydraulic device with a mobile element T, a fluid supply line CA, a pressure application line CP connected to the brake FAR and a runback line to a tank CB.

The output 31 of regulator 23 is further connected, by means of a time constant device 35, to an input 37' of an OR circuit 36, another input 37 of which is connected to a contact 74 which energizes it immediately when the first braking action takes place, for example by depressing a brake pedal 75. An output 38 of the OR circuit 36 operates switch 13 through a branch line 39 and switch 18 through a branch line 41.

In the case of a vehicle with two rear wheels, as considered here, the other rear wheel is provided with a regulator mounted in a way similar to the one described.

The fittings of a front wheel comprise a regulator 42, a first input 43 of which is connected to the potentiometer device 19, the voltage at this first input being applied to an operational amplifier 44 through a resistance 45. A second input 46 of regulator 42, to which is applied a voltage varying as a function of the speed of said front wheel, as determined by the captor 71 attributed to said front wheel, is connected to the amplifier 44 through a resistance 47, the voltages at inputs 43 and 46 being of opposite polarities.

A transfer device 48, similar to device 29, is shunt connected to amplifier 44, one input of which is grounded. The output voltage of amplifier 44 is applied to a base 49 of a transistor 50 a collector 51 of which comprises a winding 52 of an electro-hydraulic, electropneumatic or electromechanical device, for example an electrovalve regulating the brake system pressure of said front wheel.

In the example under consideration of a vehicle having two rear wheels and two front wheels, the second front wheel is fitted with a regulator device identical to that which has just been described.

Figure 2:
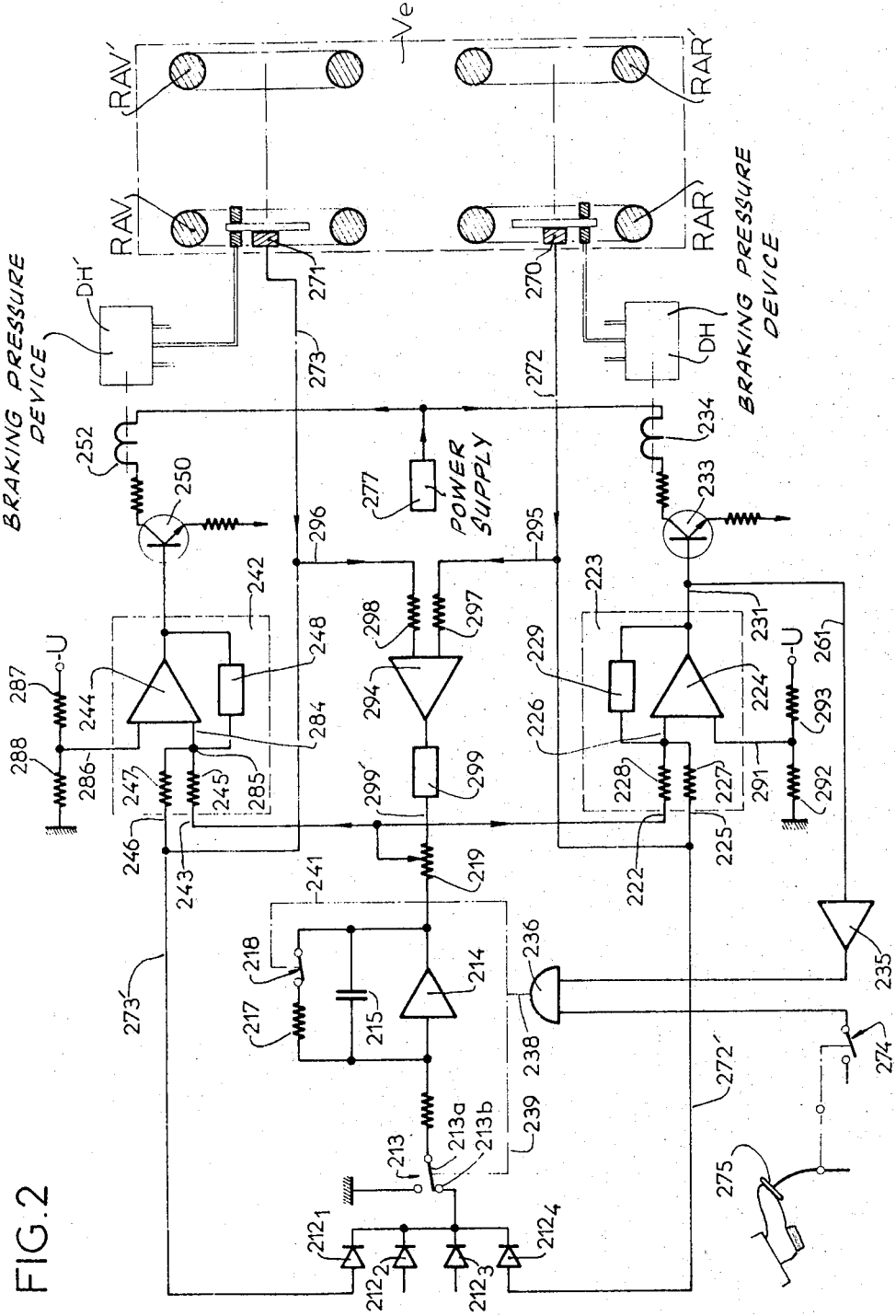
FIGS. 2 and 3 are views similar to FIG. 1 for other embodiments.

In the embodiment according to FIG. 2, the elements similar to those of the embodiment according to FIG. 1 have the same reference numbers as in the latter increased by 200. Thus, the installation according to FIG. 2 comprises speed captors 270 and 271 connected respectively to a rear wheel RAR and a front wheel RAV of a vehicle Ve, the output signals of which are adapted to be fed by conductors 272—272' and 273—273' to the input of an amplifier 214 connected to leads 272', 273' through diodes 212 and an interruptor 213 with a mobile blade 213a. The fixed contact 219b of switch 213 is connected to diodes $212_2$ and $212_3$ inserted in the circuits, which are not represented here, connected to the captors of another front wheel RAV' and another rear wheel RAR'. When the mobile blade of switch 213 is in the position represented in full line on FIG. 2, that is to say co-operating with fixed contact 213b, amplifier 214 charges a memory capacitor 215 to a capacity value corresponding to the greatest voltage in the circuits comprising the diodes 212. Shunt connected to the capacitor 215 is a resistance 217 connected by a switch 218 to a potentiometer 219 the movable member of which is connected to an input 243 of a regulator 242 associated to the front wheel RAV and to an input 222 of a regulator 223 associated to the rear wheel RAR.

The regulator 242 comprises an amplifier 244 a first input 284 of which is connected to the common point 285 of inputs 243 and 246 of said regulator and a second input 286 of which is no longer grounded as in the previous embodiment but is connected through resistances 287 and 288 to a reference voltage -U. As is usual in servomechanisms, a transfer device 248, for example a frequency dependant gain phase advance device, is shunt connected to amplifier 244.

The structure of regulator 223 is identical to that of regulator 242, with an amplifier 224, a first input 226 of which is connected to the common point of inputs 222 and 225 of said regulator and a second input 291 of which is connected through resistances 292 and 293 to the same reference voltage -U as mentioned above.

In the embodiment according to FIG. 2, the signals from captors 270 and 271 are also applied to a comperator 294 through circuits 295 and 296 in which are inserted resistors 297 and 298, preferably of the same value, the comparator 294 operating a device 299, for example a field effect transistor unit the output 299' of which fixes the bias potential of potentiometer 219.

The output of regulator 242 controls, through a transistor 250, the flow of current supplied by a source 277 in winding 252 of a DH' electro-hydraulic, electropneumatic or electromechanical device for applying braking pressure to front wheel RAV and, in the same way, output 231 of regulator 223 controls, through a transistor 233, the current flowing in winding 234 of the DH device for applying braking pressure to rear wheel RAR. Output 231 of regulator 223 is further connected, through a time constant device 235, to an input of a logic circuit 236 the other input of which is connected to a contact 274 suitable for operation by brake pedal 275, output 238 of the logic circuit 236 operating, on one hand, switch 213 through a branch line 239 and, on the other hand, switch 218 through a branch line 241.

For the purpose of clarity, only those electric circuits connected to a rear wheel RAR and a front wheel RAV have been illustrated. However, in the case of a vehicle having two rear wheels and two front wheels, a regulator similar to regulator 242 is connected to front wheel RAV', while a regulator similar to regulator 223 is connected to rear wheel RAR'.

An installation according to the invention functions in the following way:

When the braking system is operated, for example by depressing brake pedal 275, switches 213 and 218, hitherto closed, open; by means of capacitor 215 and potentiometer 219, a voltage is applied to inputs 243 and 222 of regulators 242 and 223. When the installation does not include a comparator 294, as in the embodiment represented in FIG. 1, or when it comprises such a comparator and that the circuit 299 emits a zero signal, that is to say if wheels RAV and RAR are moving at the same speed when the braking system is operated, it being supposed, to simplify the description, that the speed is 100 km/h at the moment immediately preceding braking, the voltage applied to inputs 243 and 222 is proportional to this speed, which is then memorized.

By appropriately selecting the relative values of resistances 227 and 228, as well as appropriately selecting voltage -U, regulator 229 brings the rear wheels to a speed of rotation of, for example, 80 percent of the value memorized, that is to say 80 km/h as long as the voltage at input 225 is, as an absolute value, greater than that at input 222, taking into account resistances 227, 228. In a similar way, the relative values of resistances 245 and 247 at inputs 243 and 246 of regulator 242 are selected in order that, taking into account the value of voltage -U, said regulator 242 may bring the front wheels to a speed of rotation corresponding, for example, to 70 percent of the speed value memorized, that is to say, in the example in question, 70 km/h.

The numerical values indicated above are given as a non limitative example and are chosen for a given vehicle, in such a way that the wheel operational points are close to the maximum values of the curves representing the friction coefficients $\mu$ (vertical axis) as a function of slip or skid $g$ (horizontal axis), or road friction curves represented on FIGS. 6 and 4 and referring, respectively, to a road vehicle on dry ground and to the same vehicle on wet ground.

On the diagrams in these figures, in the case of an automobile travelling on a dry road and for the numerical values above indicated, the rear wheel operational point, on braking, moves along curves 300 starting from point 0 (zero slippage or skid at the beginning of braking) to point 302 (20 percent skid corresponding to 80 km/h for a memorized speed of 100 km/h), then again the same curve, but in the opposite way, as represented by the arrows (FIG. 7), whereas the operational point of the front wheels moves along curve 301 from point 0 (zero skid at the beginning of braking) to point 303 (30 percent skid corresponding to 70 km/h), (FIG. 6), then describes a fraction of said curve, in the vicinity of its apex, oscillating, as shown by the arrows, between skid values of 10 and 30 percent respectively. For the purposes of the drawing, the parts of curve 301 described successively by the operational point of the front wheels, have been drawn in unbroken lines offset in relation to the $\mu$ axis, but it is to be understood that it is curve 301 which is constantly described by said operational point.

On the diagram of FIG. 10, in which the horizontal axis is the time axis and the vertical axis the vehicle speed axis, curve 304 represents the speed of the vehicle, which decreases during braking, and curves 305 and 306 represent the speed of the rear and front wheels respectively.

In proportion as the vehicle slows down, the current from input 225 decreases, while that representing the memorized speed, namely 100 km/h, does not vary substantially. The braking pressure, controlled by the DH device comprising winding 234 connected to power source 277, decreases and the front wheels are braked less and less.

When at the end of a first braking phase during which the speeds that the installation imposes at the rear and front wheels are substantially constant, (flat portions 308a and 309a), the speed of the vehicle becomes equal to that of the rear wheels, as shown by point 307 of the diagram, this speed is memorized, as schematically represented by the 80 km/h vertical dot and dash line, by means of the logic circuit 236 which again operates switches 213 and 218 to close them. A voltage of a polarity opposite to that of the preceding phase is then applied to input 225 of regulator 223, so that the circuit comprising winding 234 is completely energized: movile element T moves towards the right, on the drawing, establishing contact between the duct CP connected to the brake FRA and duct CD connected to the tank, so that the braking pressure on rear wheels RAR ceases: the vehicle travels at 80 km/h and the rear wheels rotate at the speed which corresponds to 80 km/h, thus without skidding or slipping. However, since the speed of the front wheels is 70 km/h, and that of the vehicle 80 km/h, the braking force continues to be exerted.

Owing to the constant voltage value -U applied to input 291 of amplifier 224, the difference between the voltages applied to the two inputs of said amplifier increases when the speed of the vehicle decreases, so that, through the control output 231 of transistor 233, the installation according to the invention brings the rear wheels to a speed such as represented by the flat portion 308b of curve 305. This latter speed is a fraction of the speed that has just been memorized and less than the fraction of the first plat portion speed of the rear wheels in relation to the initially memorized speed ($\Delta Va < \Delta Vb$). Thus, in the example under consideration, the installation brings the rear wheels, during the second braking phase, to a speed which is, for example, 73 percent of that memorized at the end of the first phase, that is to say 58.4 km/h. In the same way, regulator 242 the amplifier 244 of which has one of its inputs at the same constant potential -U brings the front wheels, during the second braking phase, to a speed represented by flat portion 309b of FIG. 10 which, in the example described is, for example, 63 percent of the speed memorized at the end of the first phase, that is to say 50.4 km/h, whereas the speed of the front wheels in the first braking phase was 70 percent of that initially memorized.

The comparison of curves 310, 311 of FIGS. 8 and 9, which show the path of the front and rear wheel operational points respectively for a vehicle speed of the order of 10 km/h, with corresponding curves 301 and 300 drawn for a vehicle speed of, for example, 100 km/h, illustrates the functioning of the installation which, by applying a constant reference voltage -U, enables the vehicle to be braked to a standstill and, in addition, enables the number of successive braking phases, and consequently that of the speed memorizing phases, to be regulated, by progressively lengthening said phases.

When, at the end of the second braking phase, the speed of the vehicle is equal to that of the rear wheels, as represented by point 312 of the diagram on FIG. 10, this speed value, in the example given 58.4 km/h, is then memorized and the process starts again.

The diagram in FIG. 11, on which the skid values of the front and rear wheels in relation to the memorized speeds have been represented on the horizontal axis and in which the speeds of the vehicle in km/h have been represented on the vertical axis, shows, by the portions AB, CD, EF, etc., the skid values to which the installation brings the rear wheels and, by the portions GH, IJ, KL, the skid values imposed on the front wheels.

If, in contradistinction with the initial hypothesis that the front wheels RAV and rear wheels RAR are at the same speed when braking begins, said wheels are at different speeds, which is for example the case, for a braking operation carried out when the vehicle is turning, the output of comparator 294 is not zero and a non-zero polarizing voltage is applied through circuit 299 to potentiometer 219. As a result, the skid value limits to which the installation brings the rear and front wheels are modified, as illustrated by curves 315 and 316 of FIG. 6 corresponding to a front wheel and showing the displacement of the operational point of such a wheel during braking. Curves 315 and 316 have been drawn, for purposes of clarity, above curve 301 whereas, in fact, the operational point of a front wheel travels along said curve 301 between the slip values staggered in relation to those previously indicated in the examples given, by 5 percent towards the low skid values for curve 315 represented in dot and dash lines and by 10 percent towards the high skid values for the continuous curve 316.

In other words whereas, in the first working hypothesis, the operational point of the front wheels travelled, during braking, along the rod friction curve between the 10 and 30 percent skid values, thus in the vicinity of the curve apex, should the front wheel RAV and rear wheel RAR speeds differ when braking begins, the operational point of a front wheel travels over that portion of the road friction curve comprised between 5 and 25 percent of skid (curve 315) when the speed of the rear wheel is less than that of the front wheel, while the operational point of the front wheels travels along the road friction curve between the skid values comprises between 20 and 40 percent of skid (curve 316) when the speed of the front wheel is less than that of the rear wheel.

Since the movable member of potentiometer 219 is connected both to an input of regulator 242 and an input of regulator 223, attributed to the front and rear wheels respectively, the comparator 294 circuit modifies the skid limit values both for the front and rear wheels.

It is therefore possible, as a function of the traffic conditions in which the vehicle finds itself at the initial moment of braking, particularly as a function of its trajectory, to adapt braking to said conditions, for example in order to take into account the fact of braking being applied when the vehicle is in a curve.

Figure 3:
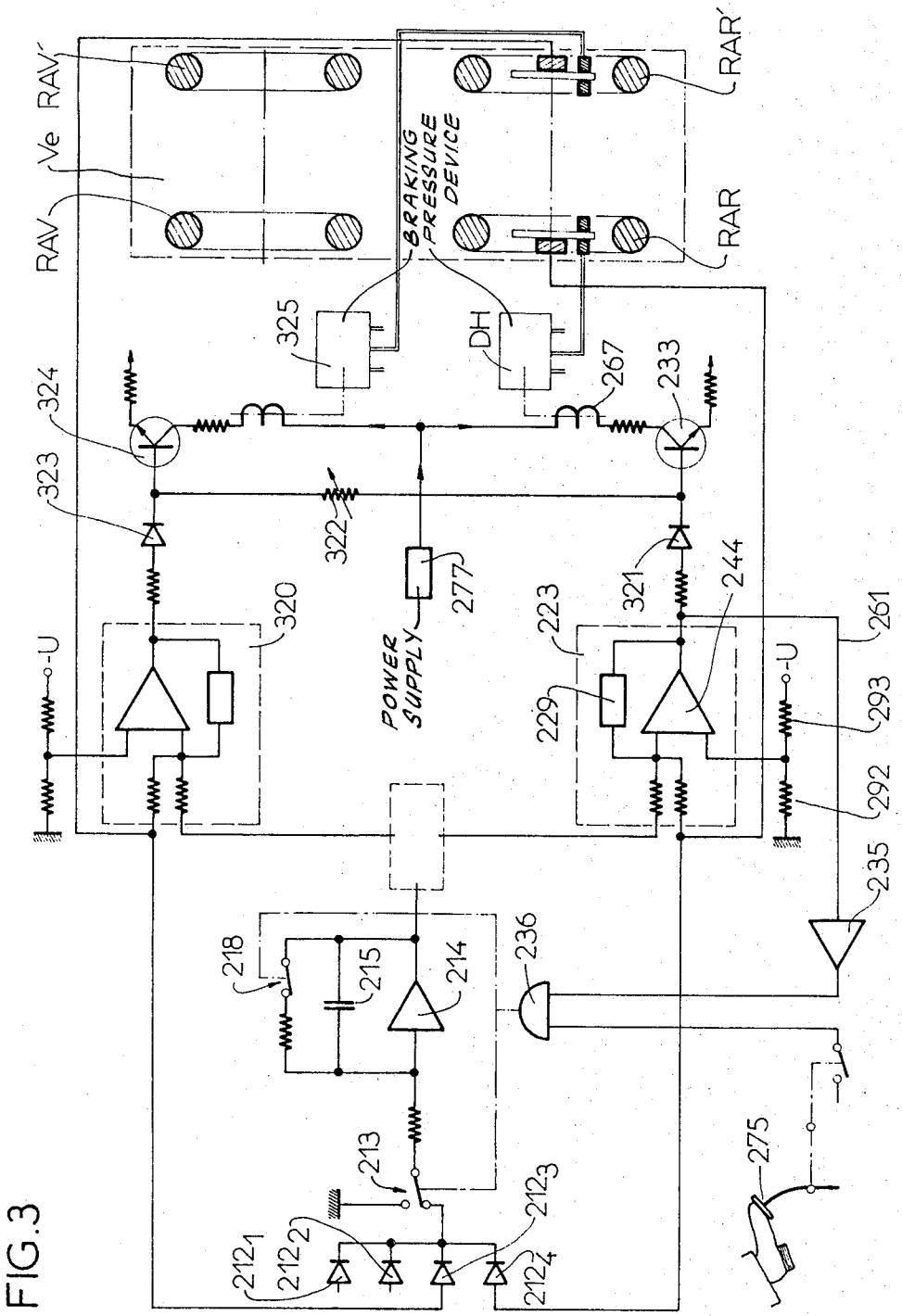

In FIG. 3, illustrating another embodiment of an installation according to the invention, the regulator 223 has been represented connected to the rear wheel RAR of the vehicle and the regulator 320 connected to another rear wheel RAR' of the vehicle Ve. The elements similar to those of the embodiment according to FIG. 2 bear the same reference numbers as the latter, certain portions of the installation represented in FIG. 2 being omitted for purposes of clarity.

In the embodiment according to FIG. 3, between the regulator 223 and the transistor 233 controlling the braking force through the DH electropneumatic, electro-hydraulic or electromechanical device, is inserted a diode 321 connected by a variable resistor 322 to a diode 323 inserted between the output of regulator 320 and transistor 324 controlling a device 325, advantageously of the same type as the DH device for applying the braking force to rear wheel RAR'.

In such an installation, the most positive of the signals coming from regulators 223 and 320, that is to say the one corresponding to a decrease in braking force, has priority in operating transistors 233 and 324 so that the installation functions as follows:

As long as the road friction conditions are identical for the four wheels of the vehicle, the installation functions in the same way as in the embodiment described above, as represented on the left hand portion of the diagram of FIG. 12, between moments $o - r$ and $r - s$. In this diagram, which is similar to that of FIG. 10, curve 340 represents the speed of the vehicle, curves 341 and 342 representing, respectively, the speeds of the rear wheel RAR' and of the rear wheel RAR, while curves 343 and 344 represent the speeds of the front wheels RAV' and RAV.

When the road friction conditions are modified, for example improve between moments $s$ and $u$, with respect to conditions between moments $o$ and $r$, while remaining identical for the four wheels, the result is that the vehicle brakes more rapidly, as shown by the greater slope, on the horizontal axis, of curve 340 representing the speed of the vehicle.

When, starting from moment $u$, the friction of all the wheels is no longer the same, for example if the friction of wheels RAV' and RAR' abruptly decreases when they come into contact with a sheet of ice or other, then said wheels tend to lock, as shown by portions 345 and 346 of curves 341 and 343, the friction conditions of wheels RAV and RAR being as represented on FIG. 6 and those of wheels RAV' and RAR' being those as represented on FIG. 4.

In order to compensate for the tendency of rear wheel RAR' to lock, the braking pressure applied by device 325, the response curve of which is represented on FIG. 5 in which the braking pressures are represented on the vertical axis and the operating voltage supplied by transistor 324 is shown on the horizontal axis, decreases by the value represented by point M to the value represented by the point N. AS the signal emitted by the regulator 320 imposes its action, it is again, on one hand, a predetermined fraction of the speed memorized at the end of the preceding phase and represented by the dot and dash line 347 in FIG. 12, that the installation causes rear wheel RAR' to take whereas, through resistance 322, transistor 233 is is also operated by the signal emitted by regulator 320 to activate device DH with the same response curve as that of device 325 and causes the same braking pressure to be exerted on rear wheel RAR as that exerted on the other rear wheel in order to prevent a torque from being applied to the vehicle which would tend to cause the latter to deviate from its trajectory. The vehicle is then braked in accordance with the worst road friction conditions that its wheels, that is to say wheels RAV' and RAR', encounter, so that its braking is less rapid than before, as illustrated by the gentler slope, on the horizontal axis, of the curve 340 starting from moment $u$.

When, at the end of the braking phase that has just been described, the speed of the vehicle is again equal to that of the rear wheels, as represented by point 348 of the diagram on FIG. 12, it is again said speed that memorized and the process starts again.

Adjustable resistor 322 enables the voltage applied to the bases of transistors 233 and 224 to be balanced and, consequently, the braking pressures applied by means of devices DH and 325. Thus, the variation in value of resistance 322 may be linked to an external control factor, such as the position of the steering wheel of the vehicle, or the position of the latter or any other appropriate means for detecting the condition of the vehicle in order to operate differential braking of the wheels not only as a function of the friction conditions but also as a function of the trajectory and/or the lifting forces exerted on the vehicle.

What is claimed is:

1. A process for braking a vehicle having a first wheel group with at least one front wheel and a second wheel group with at least one rear wheel, in which the speed of a wheel and the speed of the vehicle are determined, the latter being memorized and used to operate a subsequent braking phase, comprising the step of, in a first braking phase, braking at least one wheel of one of said wheel groups to a first speed corresponding to a first skid value predetermined in relation to the memorized speed of the vehicle, this phase being continued until the speed of the vehicle is equal to said first speed, the step of simultaneously braking at least one wheel of the other of said wheel groups to a second speed corresponding to a second skid value predetermined in relation to the memorized vehicle speed greater than the first skid value, and the step of, at the end of this first phase to memorize said first speed and start a second braking phase for which said first speed plays the part of the vehicle speed memorized during the first phase, and sequentially the steps performed in the first and second braking phases.

2. A process according to claim 1, wherein the first and second skid values, in relation to the memorized speed of the vehicle, are determined by comparing the speed of at least one front and at least one rear wheel.

3. A process according to claim 1, wherein the braking forces applied to the wheels of the vehicle are determined as a function of the friction between the wheels and the surface traversed by the vehicle.

4. A process according to claim 3, wherein identical braking forces are applied to all wheels whatever the friction between the surface being traversed and said wheels.

5. A process according to claim 1, wherein the skid values, with respect to the memorized vehicle speed, increase during the different braking phases for the first wheel group and for the second wheel group.

6. An installation for braking a vehicle having at least one front wheel and at least one rear wheel comprising sensors for determining the speed of the wheels, means for memorizing the speed of the vehicle, means operating the memorizing means at the beginning of a braking phase, means for braking at least said one rear wheel so as to bring it, during a first braking phase, to an angular speed that corresponds to a first fraction of the memorized speed until the speed of the vehicle has become equal to said first fraction, means for braking at least said one front wheel, during this first phase, in order to bring it to an angular speed corresponding to a second fraction smaller than the first fraction of the memorized vehicle speed and means for re-activating, at the end of said braking phase, the means for memorizing the speed of the vehicle which, with respect to the speeds of the front and rear wheels during a second braking phase, plays the same part as the speed memorized at the beginning of the first phase.

7. An installation according to claim 6, further comprising associated with each of the wheels of the vehicle an electrically operated braking device, and wherein said means for braking said at least one rear wheel comprises a first regulator controlling the braking device associated with the rear wheel and the means for braking said at least one front wheel comprises a second regulator controlling the braking device associated with the the front wheel.

8. An installation according to claim 7, wherein the regulators receive, at one of their inputs, a signal corresponding to the memorized speed value, both at the beginning of the braking and when the speed of the vehicle is equal to the speed of the rear wheels and, at another of their inputs, a signal corresponding to the value of the speed of the wheel or group of wheels to which they are connected, their output signals operating braking devices to which they are connected in order to obtain the required wheel speeds.

9. An installation according to claim 7, wherein the regulators are adjusted so that the speed imposed on at least said one rear wheel corresponds substantially to the maximum of the road friction curve as a function of the slippage and so that the speed of the front wheel or wheels correspond substantially to the maximum of said curve increased by 10 percent.

10. An installation according to claim 7, wherein each regulator comprises an amplifier mounted as a comparator and to which is shunt connected a servo-mechanism correcting transfer device.

11. An installation according to claim 10, wherein one of the comparator input values is a constant reference voltage.

12. An installation according to claim 6, wherein the memorizing means are adapted to be rendered operative, on the one hand, on initial operation of a braking means and, on the other hand, by logic means associated with the braking means of at least said one rear wheel or wheels to which they are connected by time delay means to successively memorize the speed values of the vehicle during a braking period when such speed is equal to that of the rear wheels.

13. An installation according to claim 6, wherein the memorizing means comprise sensors connected to the wheels of the vehicle, a capacitor charged by an amplifier to a capacitance value corresponding to the highest voltage value supplied by said sensors connected to the wheels of the vehicle.

14. An installation according to claim 6, further comprising means comparing the speed of at least one front wheel and at least one rear wheel, the output of which, when different from zero, serves to determine the slippage values to which the installation brings the wheels.

15. An installation according to claim 6, further comprising means for applying braking forces determined as a function of the wheel friction conditions of the trajectory of the vehicle and its lifting forces.

16. An installation according to claim 15, wherein on the wheel regulator outputs are provided unidirectional current circulating means connected by a variable resistor.

17. An installation according to claim 16, wherein the variable resistor is controlled by a factor depending of the vehicle, like the lifting forces exerted on the vehicle or its position or its trajectory determined by an appropriate sensor device or the position of its steering wheel.

18. An installation according to claim 6, further comprising means for modifying the slippage values, during braking and as a function of the speed of the braked vehicle speed in relation to a memorized speed of the vehicle to which it brings the wheels of the vehicle.

* * * * *